This invention relates to a shut-off valve. In another aspect it relates to a chromatographic analyzer system employing a power fluid operated, shut-off valve between a sample source and a power fluid-actuated sampling valve, for assuring size uniformity of the sample slugs passed to the sorption column. In one aspect it relates to a delayed pressure-release, shut-off valve which completely closes off sample conduit flow at the end of a pre-set interval, or while the power fluid supply to the analyzer system is interrupted.

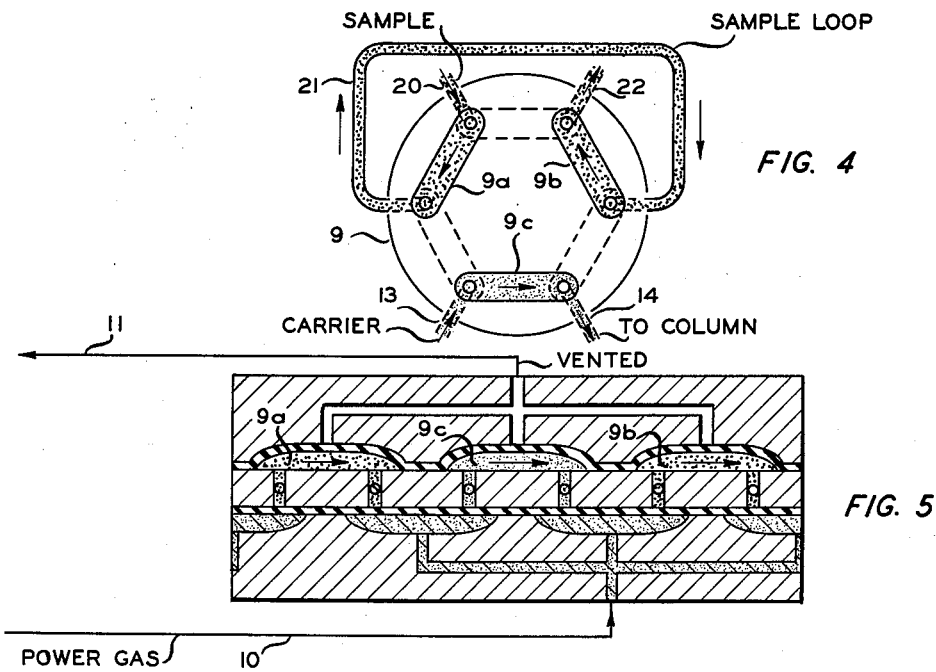
FIG. 4
FIG. 5
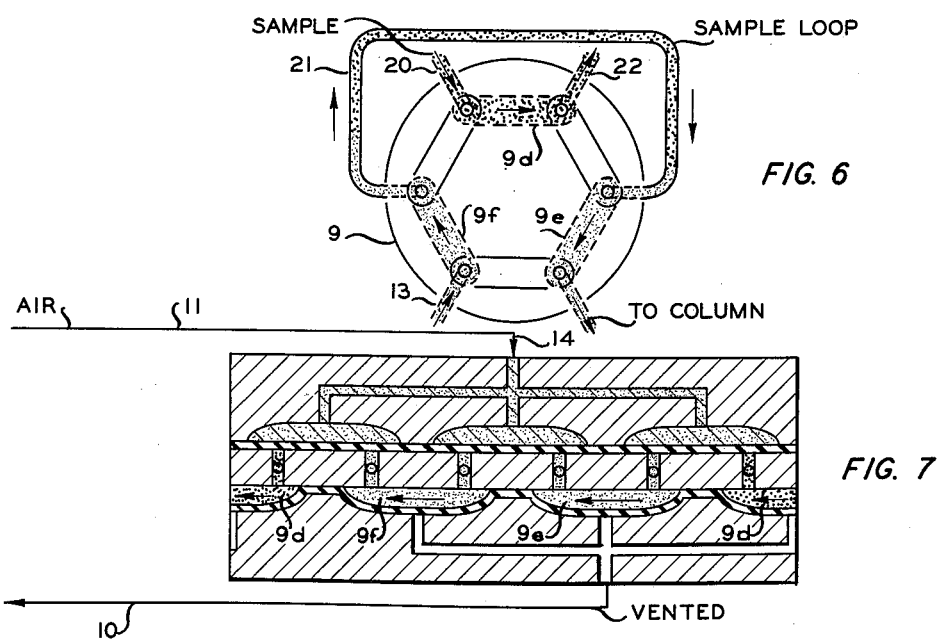
FIG. 6
FIG. 7
INVENTOR.
M. E. REINECKE 3,077,766
SHUT OFF VALVE FOR CHROMATOGRAPHIC SYSTEM
Marvin E. Reinecke, Bartlesville, Okla., assignor to Phillips Petroleum Company, a corporation of Delaware
Filed July 8, 1960, Ser. No. 41,667
3 Claims. (Cl. 73—23)

Chromatographic analyzer systems are increasingly employed in the monitoring of process streams to provide automatic process control. This is because certain features of process chromatography, such as specific measurement, high sensitivity, and simplicity of operation, make this type of analyzer very attractive for use in automatic process control. There are, however, some apparently inherent features of chromatography which have appeared to be obstacles in adapting chromatography to wide-spread use in process control.

One of these features is the problem of periodically directing a sample slug of constant size to the sorption columns. Slug size uniformity is required in order to enhance the comparability of the chromatograms from one sampling time to the next for a given sample stream. This objective is hindered by the varying flow rates and fluid pressures of the sample stream passing from the process stream to the sampling valve, which fluctuations are often unavoidable in plant operations. Consequently, for reliability of analyzer readings, some means of assuring that a uniform amount of sample is being repeatedly carried to the sorption columns is required.

Moreover, when the power gas supply to the analyzer system fails, some means of automatically terminating the flow of sample fluid to the sampling valve, for as long as the shut down occurs, is desired. This latter feature is to prevent flammable, vaporized hydrocarbon sample from continuously bleeding from the process stream and venting through the sampling valve exhaust, thereby increasing the explosion hazard. Also, while the sealing members of the sampling valve are inoperative due to power gas failure, sample gas is prevented from passing to the sorption columns in an uncontrolled volume, thereby "loading" the column adsorbent, and often requiring replacement thereof.

In accordance with the present invention, there is provided a delayed pressure-release, shut-off valve which can be positioned between a process stream and a sampling valve, usually in the sample supply conduit of a vapor phase chromatographic analyzer. The sample shut-off valve of this invention is used in cooperation with a pilot valve in controlling the operation of a fluid-actuated, sampling valve.

The shut-off valve is intermittently slowly opened and closed and during the time it is open the sample fluid passes unrestricted therethrough to the sampling valve and is vented therefrom through the sample exhaust line. When the pilot valve switches the power gas stream to the opposite side of the sampling valve and said power gas no longer flows to said sample shut-off valve the sample fluid now passes through the sample loop of the sampling valve prior to being vented. By the time the preset pressure is reached, the plunger of the shut-off valve is once again seated, and no more sample gas is flowing to the sampling valve, thus permitting the sample gas already in the sample loop to come to equilibrium conditions. When the pilot valve again switches the power gas stream back to the first side of the sampling valve, a stabilized amount of sample is swept from the sample loop to the sorption column by carrier gas passing thereto.

It is, therefore, an object of this invention to provide an improved, delayed pressure-release, shut-off valve.

Another object is to provide a chromatographic analyzer system incorporating a delay pressure-release, sample stream shut-off valve between a process stream to be analyzed and a sampling valve for assuring size uniformity of the sample slugs passing to the sorption column.

A further object is to provide a safety shut-off valve in the sample gas conduit which automatically terminates sample fluid flow in the event of failure of the power gas supply, but which becomes re-operative as soon as the power gas supply is restored.

A still further object is to minimize the presence of a combustible fluid mixture in a chromatographic analyzer system in the event of power gas supply failure.

A further object is to prevent "loading" of the sorption column adsorbent and replacement thereof due to failure of the power gas supply to the sampling valve of a chromatographic analyzer.

Further objects and advantages of this invention will become apparent to those skilled in the art without departing from the scope and spirit of this invention and it should be understood that the latter is not necessarily limited to the aforementioned discussion and accompanying drawing, in which:

FIGURE 4 is a diagrammatic plan view of a diaphragm sampling valve in one position of operation, corresponding to the first open position of the shut-off valve of this invention while being bled down to the closed position;

FIGURE 5 is a schematic view of a typical diaphragm sampling valve shown in a position of operation corresponding to FIGURE 4;

FIGURE 6 is a diagrammatic plan view of a diaphragm sampling valve in the alternate position of operation, corresponding to the second open position of the shut-off valve while it is being pressured to the fully open position, and;

FIGURE 7 is a schematic view of the typical diaphragm sampling valve shown in another position of operation corresponding to FIGURE 6.

Figure 1:
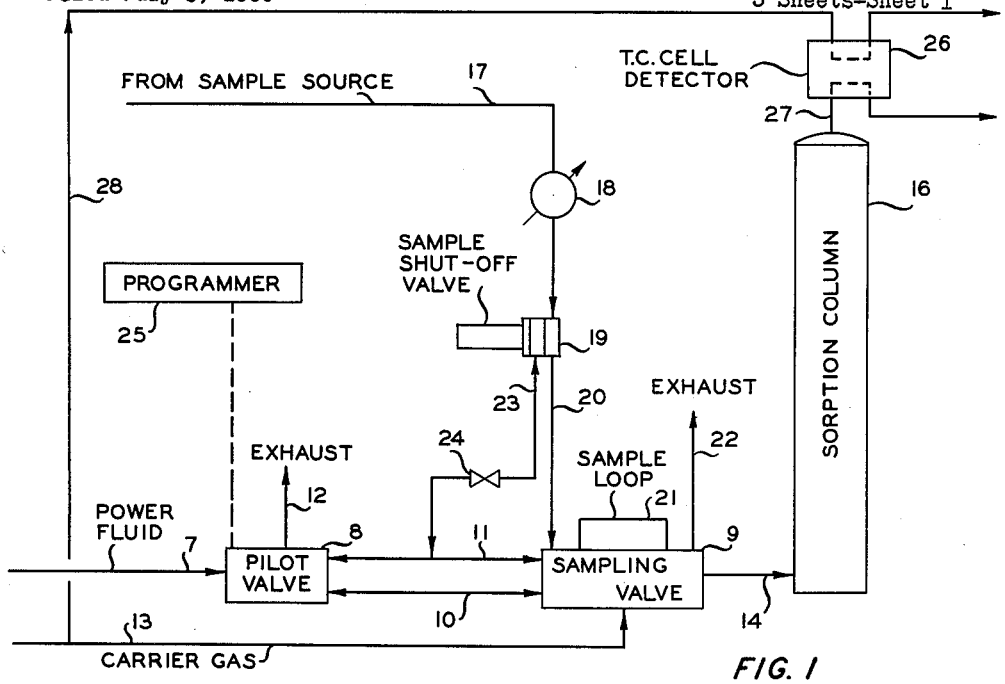
FIGURE 1 is a simplified flow sheet of a chromatographic analyzer in which the valve of this invention is used as the sample shut-off valve.

Referring now to the drawing in detail, wherein like parts have been designated by like reference numerals, and to FIGURE 1 in particular, wherein a power gas such as air, passes via conduit 7 to pilot valve 8. The power gas stream is directed therefrom to the first or second inlets of a fluid actuated sampling valve 9 via conduits 10 and 11. While power gas is passing through conduit 10 to the sampling valve 9, the second side of valve 9 is being vented via conduit 11, pilot valve 8, and pilot valve exhaust conduit 12. Conversely, when power gas is passing through conduit 11 from pilot valve 8, the first side of sampling valve 9 is being vented through conduit 10.

A carrier gas, such as helium or hydrogen, continuously enters the system via conduit 13, through sampling valve 9, conduit 14, and on to sorption column 16. A sample stream enters the system through conduit 17, passing through a preheater 18 to vaporize the sample stream, if necessary, through a shut-off valve 19, via conduit 20 to sampling valve 9. When pilot valve 8 permits power gas to flow to the first side of sampling valve 9, via conduit 10, gaseous sample is passing through sample loop 21 thereof, and is being vented through sample exhaust conduit 22. Simultaneously, power gas is bleeding back from shut-off valve 19 through conduit 23, having flow restrictor 24 therein, via conduit 11 to pilot valve 8, being vented therefrom by exhaust conduit 12. Restrictor 24 can be any conventional needle valve of suitable size. The gas bleed down time from valve 19 to exhaust 12 can be experimentally varied to give a desired time interval, merely by adjustment of the size of the orifice of restriction 24.

Delayed pressure-release shut-off valve 19 is positioned in conduit 17 downstream from preheater 18. Shut-off valve 19 is intermittently retained in the open position, during which time fluid sample passes unrestricted to sampling valve 9, and is vented directly therefrom through sample exhaust conduit 22. Shut-off valve 19 operates in cooperation with pilot valve 8, which also controls the operation of sampling valve 9. Pilot valve 8, in turn, is controlled by programmer 25. Periodically, sample fluid is passed along by carrier gas, via conduit 14, to sorption column 16, where constituents of the sample to be identified and measured, are absorbed and adsorbed, depending upon the nature of the sorbent material. They are then selectively desorbed by the continuing flow of carrier gas through column 16.

The sorption column effluent passes through an analyzer, indicated as thermal conductivity cell assembly 26 via conduit 27. The output signal from TC detector 26 is passed to a recording instrument (not shown), which can be a conventional strip chart recorder. Part of the carrier gas stream is passed from conduit 13 via conduit 28 directly to the reference side of thermal conductivity cell 26, so as to balance out the effect of the sample-charged carrier gas stream passing through the first side of detector 26.

Pilot valve 8 is actuated by programmer 25, which can be operated by a time cycle or other means. For a detailed discussion of the design and manner of operation of a typical pilot valve to be used in conjunction with this invention, see the co-pending application of Emmerich Guenther, Serial No. 858,997, filed December 11, 1959.

When pilot valve 8 is changed from the first described position, power gas is now directed to the second side of sampling valve 9, via conduit 11, and the carrier gas now passes therethrough to sample loop 21, collecting the sample slug trapped therein, and carrying the same out of sample loop 21 to conduit 14. Thus, each time pilot valve 8 is switched to the second position of operation, a measured sample is passed via conduit 14 through column 16. For a more detailed discussion of the design and manner of operation of a pneumatically-actuated, diaphragm sampling valve to be used in conjunction with this invention, see the co-pending application of M. E. Reinecke, and D. V. Eckert, Serial No. 8,548, filed February 15, 1960.

Figure 2:
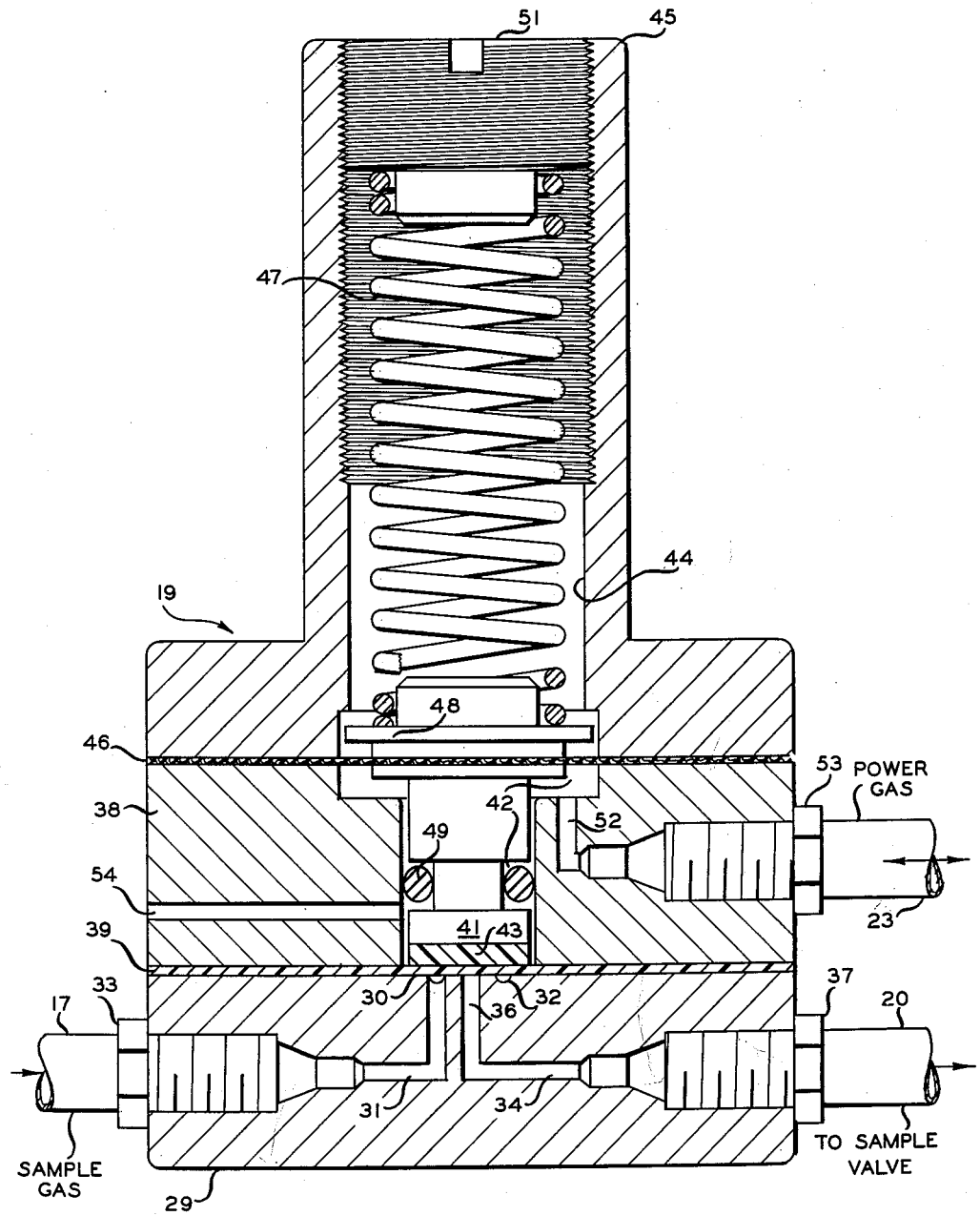
FIGURE 2 is a cross sectional elevation of a shut-off valve of this invention with the plunger seated, and the valve in the closed position.

In FIGURE 2, there is shown an elevation view in full section of the assembled, delayed pressure release, sample shut-off valve of this invention, generally designated 19. Shut-off valve 19 comprises a valve body 29, having a centrally disposed valve seat 30 on the upper surface thereof. A first passage means 31 is provided in valve body 29 communicating between sample gas inlet conduit 17 and an annular groove 32 in valve seat 30. Passage 31 is counterbored and threaded at its external end to receive therein an inlet nut 33 for securably connecting conduit 17 to valve body 29. Valve body 29 is further provided with a second passage means 34 communicating between the center 36 of annular groove 32 and a sample gas outlet conduit 20 leading to sampling valve 9. Passage 34 is also counterbored and threaded at its external end and is adapted to receive therein a connecting nut 37 for securably connecting conduit 20 to valve body 29.

Plunger body 38 is mounted adjacent to valve body 29 and is spaced therefrom by a semi-rigid diaphragm 39, composed of a material such as a thermosetting plastic, which is chemically inert and heat resistant. A preferred material for diaphragm 39 is 3 mils in thickness and made of Teflon (a polymer of tetrafluoroethylene).

A valve plunger 41 is disposed in plunger chamber 42 and is sealably engageable with plastic disc 43, which is adjacent to diaphragm 39 in one position of operation. Cylindrical disc 43, preferably of Viton A (a copolymer of hexafluoropropylene and vinylidene fluoride) which will not cold flow and is resilient, is positioned in chamber 42 between diaphragm 39 and plunger 41, to provide uniform pressure on diaphragm 39. A compression spring chamber 44 is located adjacent to plunger chamber 42 and is spaced therefrom by a second diaphragm 46. A preferred material for diaphragm 46 is Fairprene coated fabric which is formed by impregnating synthetic elastomeric compositions on both sides of woven fabrics. These compositions may be made from many types and grades of oil-resistant synthetic rubbers.

A compression spring 47 is disposed in spring chamber 44 adjacent to diaphragm 46. Spring 47 has sufficient tension, when transmitted through spring retaining disc 48, diaphragm 46, plunger 41, and plastic disc 43, to maintain the spring assembly in a seated position against diaphragm 39, thereby sealing communication between passages 31 and 34. An O-ring 49, surrounds a channeled portion of plunger 41, and is in sealing contact with the walls of plunger chamber 42, in order to minimize the escape of power gas therefrom. A pressure-adjusting screw 51 is threadedly secured in the external end of spring chamber 44, for varying the tension in spring 47, as desired.

A passage 52 is provided in plunger body 38 communicating between power fluid conduit 23 from pilot valve 8 and plunger chamber 42. Power fluid, under greater than atmospheric pressure, is conducted to chamber 42, as desired. Passage 52 is counterbored and threaded at its external end to receive a connecting nut 53 for securably fastening conduit 23 to plunger body 38. A fourth passage 54 is provided in plunger body 38 communicating between the lower portion of plunger chamber 42 and an area external of said shut-off valve, which serves primarily as a pressure equalizing vent.

The tension desired in compression spring 47, which is controlled by adjusting screw 51, as described, is chosen so as to be equal in pounds to the power gas pressure in chamber 42 at which plunger 41 is to be seated against disc 43. The available power gas pressure which can be transmitted to chamber 42 must exceed the preset tension in spring 47, in order to be able to release plunger 41 from exerting a sealing force against disc 43 and diaphragm 39.

Figure 3:
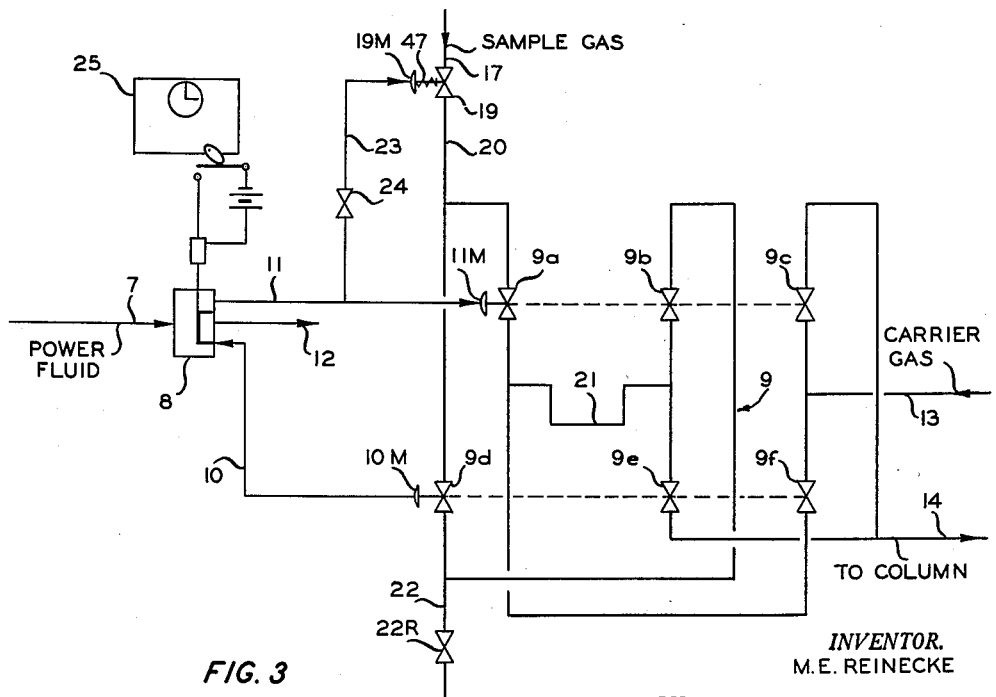
FIGURE 3 is a schematic view of a portion of the chromatographic analyzer showing the cooperative method of operation of the sample shut-off, pilot and sampling valves.

In FIGURE 3, there is shown a schematic view of a portion of the chromatographic analyzer system which incorporates the novel combination of valves of this invention, and will be employed in the detailed description of the method of operation of this system which follows.

In operation, when power gas is flowing via conduit 11 to motor 11M of sampling valve 9, power gas is simultaneously flowing through conduit 23 and flow restrictor 24 therein, to actuate motor 19M of shut-off valve 19. This power gas pressure opposes the spring tension of spring 47 which normally biases shut-off valve 19 closed. In actuality, the power gas pressure building up in plunger chamber 42 of FIGURE 2, will overcome the spring tension bearing on the opposite side of diaphragm 46 via retaining disc 48, lifting plunger 41 from valve seat 30, permitting sample gas flow between conduits 31 and 34 across valve seat 30 under diaphragm 39. This, of course, permits sample feed from inlet conduit 17 to pass to sampling valve inlet conduit 20. As the power gas has actuated motor 11M to close passages 9A, 9B, and 9C of sampling valve 9, sample gas enters valve 9 from conduit 20, flows through passage 9D, and is vented via conduit 22, having restriction 22R therein. Meanwhile, carrier gas enters valve 9 from conduit 13, transits passage 9F, then through sample loop 21, back through passage 9e, and out of valve 9 via conduit 14 to sorption column 16. Plunger 41 of valve 19 will remain in the raised position until such time as the power gas pressure in plunger chamber 42 is released.

When programmer 25 directs pilot valve 8 to switch positions, the power gas stream now flows only to motor 10M of sampling valve 9, via conduit 10, and is no longer flowing to shut-off valve motor 19M via conduits 11 and 23. As the power gas has now actuated motor 10M to close passages 9D, 9E, and 9F of sampling valve 9, sample gas must enter through passage 9A, pass through the sample loop 21, back into passage 9B, and is vented from valve 9 via conduit 22, having restriction 22R therein. Meanwhile, carrier gas, enters from conduit 13, transits passage 9C, and passes directly therefrom to conduit 14 and thence to column 16.

Simultaneously, the power gas in motor 19M is bleeding back therefrom through flow restrictor 24 in conduit 23. The needle adjustment in the flow restrictor can be adjusted to permit this bleed back to occur over a predetermined period of time, perhaps several seconds, down to a preset pressure. When this preset pressure, usually about equal to the spring tension, is reached, motor 19M is off and valve 19 is closed, that is, as shown in FIGURE 2, plunger 41 is once again seated against disc 43, and thus diaphragm 39 is sealed against valve seat 30. Thus, sample gas is no longer flowing through shut-off valve 19 to sampling valve 9. This permits the fluid sample already in sample loop 21 of valve 9 to achieve equilibrium conditions.

When pilot valve 8 again switches positions, power gas is again directed back to motor 11M of sampling valve 9 via conduit 11, and power gas once more flows thereto, reopening valve 19, re-establishing sample flow from conduit 17 through conduit 20 to sampling valve 9, and through passage 9D thereof, directly to vent via conduit 22. Meanwhile, a stabilized amount of trapped fluid sample is being swept from the sample loop 21 to sorption column 16, via conduit 14, by carrier gas now passing through the sample loop.

Thus, the shut-off valve of this invention assures sample size repeatability by shutting off sample gas flow to the sampling valve just a few seconds before the sampling valve's position is switched by pilot valve 8, during which interval the sample achieves pressure equilibrium, and drives the sample slug trapped therein to column 16.

FIGURES 4-7 show, diagrammatically, the operation of a diaphragm sampling valve which can be operated advantageously by the sample shut-off valve of this invention in conjunction with the previously described pilot valve. The sampling valve is usually operated by air as the power gas, although the controlling pilot valve and sample shut-off valve can be operated by the carrier gas where it is the only power fluid available.

The paths travelled by the gaseous sample and the carrier gas through sampling valve 9 and sample loop 21 thereof, are shown in FIGURE 4, which corresponds to the first open position of the shut-off valve of this invention while being bled down to the closed position.

FIGURE 5 shows carrier gas passing through the passage 9C, and sample gas passing through the companion passages 9A and 9B. Power gas pressure is being applied to the lower side of valve 9 via conduit 10, while the upper side is being vented through conduit 11.

When pilot valve 8 (not shown) switches the power gas to conduit 11, the diaphragms in the sampling valve reverse position, and the paths travelled by the gaseous sample and carrier gas through sampling valve 9 are shown in FIGURE 6. Carrier gas is in the initial stage of driving the trapped sample slug to column 14. The view in FIGURE 6 corresponds to a second, slightly open position of shut-off valve 19 while it is being pressured to the fully open position.

FIGURE 7 shows sample gas passing through passage 9D of valve 9 while carrier gas passes through the companion passages 9E and 9F. Power gas pressure is being applied to the upper side of valve 9 through conduit 11, while the lower side thereof is being vented through conduit 10.

Although the valve as described is applied to a chromatographic analyzer, it is not limited thereto but can be employed in any situation where a fluid-actuated, delayed pressure-relief shut-off valve is indicated. Reasonable variations and modifications are possible within the scope of this disclosure without departing from the spirit and scope of the invention.

I claim:

1. A shut-off valve comprising, in combination, a valve body including a valve seat, a plunger body mounted adjacent to said valve body and spaced therefrom by a flexible first diaphragm, a plunger chamber in said plunger body, a valve plunger in said plunger chamber engageable with said first diaphragm adjacent said valve seat, a compression spring chamber adjacent said plunger chamber and spaced therefrom by a metal second diaphragm, a compression spring disposed in said spring chamber having sufficient tension to bias said plunger in a closed position on said first diaphragm, a pressure adjusting screw threadedly disposed in the external end of said spring chamber for varying the tension in said spring as desired, first passage means in said valve body for communicating between a sample gas inlet conduit and an annular groove in said valve seat, a second passage means in said valve body communicating between the center of said annular groove and a sample gas outlet conduit leading to an external sampling valve, a third passage means in said plunger body disposed between said first and second diaphragm, for conducting a power fluid under pressure as desired to said plunger chamber, an O-ring slidably surrounding said plunger and in sealing contact with the walls of said plunger chamber, a fourth passage means in said plunger body for permitting the venting of any power gas from said plunger chamber that may leak by said O-ring, said shut-off valve being operable in one position to permit unrestricted flow of fluid sample from said first passage means across said valve seat to said second passage means when said power gas pressure in said plunger chamber overcomes the opposing spring tension and lifts said plunger from sealing contact with said valve seat, and said shut-off valve in another position of operation preventing the flow of sample gas therethrough when the tension of said spring exceeds the opposing pressure of said power fluid in said plunger chamber and sealably seats said plunger against said valve seat.

2. In a chromatographic analyzer system, means for periodically passing a sample slug of uniform size to a sorption column therein comprising, in combination: a sampling valve having a sample loop of fixed volume; flexible diaphragm means within said sampling valve responsive to the application of power fluid pressure to two sides thereof to actuate said sampling valve between two positions of operation; a first conduit means connected to said sampling valve to supply a fluid sample to said sampling valve; a shut-off valve disposed in said first conduit means; a second conduit means communicating between said sampling valve and said column; a pilot valve; third conduit means communicating between a source of power fluid and said pilot valve; fourth conduit means communicating between said pilot valve and said flexible diaphragm means; fifth conduit means communicating between said pilot valve and said flexible diaphragm means; sixth conduit means communicating between said fifth conduit means and with said shut-off valve; diaphragm means in said shut-off valve responsive to said power fluid to open and retain open said shut-off valve, so long as said power fluid is being supplied to the same; biasing means in said shut-off valve to close the same when said power fluid is removed from said valve; time cycle means operatively connected to said pilot valve to alternately switch said pilot valve between a first position of operation during a first time interval and a second position of operation during a second time interval, said power gas flowing thru said fourth conduit means during said first time interval, pressuring said flexible diaphragm means while said power gas is bleeding down from said shut-off valve via said sixth and fifth conduit means; said power gas flowing thru said fifth and sixth conduit means during said second time interval, pressuring said flexible diaphragm means and also opening and maintaining open said shut-off valve; and a flow restriction means disposed in said sixth conduit means adapted for control of the bleed down time of said power fluid from said shut-off valve, thereby closing said shut-off valve after a predetermined third interval of time within said time interval, whereby fluid sample in said sample loop is permitted to come to equibrium conditions before said sample loop is switched into a stream of carrier gas passing to said column.

3. In a chromatographic analyzer system, means for periodically passing a sample slug of uniform size to a sorption column therein comprising, in combination: a sampling valve having a sample loop of fixed volume; flexible diaphragm means within said sampling valve responsive to the application of power fluid pressure to two sides thereof to actuate said sampling valve between two positions of operation; a first conduit means connected to said sampling valve to supply a fluid sample to said sampling valve; a shut-off valve disposed in said first conduit means; a second conduit means communicating between said sampling valve and said column; a pilot valve; third conduit means communicating between a source of power fluid and said pilot valve; fourth conduit means communicating between said pilot valve and said flexible diaphragm means; fifth conduit means communicating between said pilot valve and said flexible diaphragm means; sixth conduit means communicating between said fifth conduit means and with said shut-off valve; diaphragm means in said shut-off valve responsive to pressure of said power fluid to open and retain open said shut-off valve so long as said power fluid is supplied thereto; spring means in said shut-off valve for biasing closed the same when power fluid is released therefrom; and a flow restriction means disposed in said sixth conduit means adapted to delay the closing of said shut-off valve when said fluid bleeds back through said sixth conduit; time cycle means operatively connected to said pilot valve to alternately switch said pilot valve between a first position of operation during a first time interval and a second position of operation during a second time interval, said power gas flowing thru said fourth conduit means during said first time interval, pressuring said flexible diaphragm means while said power gas is bleeding down from said shut-off valve via said sixth and fifth conduit means; said power gas flowing thru said fifth and sixth conduit means during said second time interval, pressuring said flexible diaphragm means and also opening and maintaining open said shut-off valve, thereby closing said shut-off valve after a predetermined interval of time, whereby fluid sample in said sample loop is permitted to come to equilibrium conditions before said sample is switched into a stream of carrier gas continuously passing to said column.

References Cited in the file of this patent

UNITED STATES PATENTS

| 2,675,758 | Hughes | Apr. 20, 1954 |
| 2,964,938 | Fuller | Dec. 20, 1960 |

OTHER REFERENCES

Gas Chromatography by D. H. Desty, published in London by Butterworths Scientific Publication, 1958. (Copy in Div. 36.)

UNITED STATES PATENT OFFICE
CERTIFICATE OF CORRECTION

Patent No. 3,077,766                  February 19, 1963

Marvin E. Reinecke

It is hereby certified that error appears in the above numbered patent requiring correction and that the said Letters Patent should read as corrected below.

Column 7, line 28, after "said", first occurrence, insert -- first --; line 29, for "equibrium" read -- equilibrium --.

Signed and sealed this 1st day of October 1963.

(SEAL)
Attest:

ERNEST W. SWIDER                   DAVID L. LADD

Attesting Officer                   Commissioner of Patents